United States Patent

Hamm

[15] 3,671,635

[45] June 20, 1972

[54] CHEMOSTERILANT COMPOSITIONS FOR FLIES AND METHOD OF USE

[72] Inventor: Philip C. Hamm, Glendale, Mo.

[73] Assignee: Monsanto Company, St. Louis, Mo.

[22] Filed: May 27, 1970

[21] Appl. No.: 41,100

Related U.S. Application Data

[63] Continuation-in-part of Ser. No. 677,082, Oct. 23, 1967, abandoned.

[52] U.S. Cl. ....................424/319

[51] Int. Cl. ....................A01n 9/24

[58] Field of Search ....................424/319

[56] References Cited

FOREIGN PATENTS OR APPLICATIONS 5,598 7/1957 Japan

OTHER PUBLICATIONS

Borkovec, Insect Chemosterilants (1966) pages 61–63

*Primary Examiner*—Sam Rosen

*Attorney*—Paul C. Krizov, Neal E. Willis and John J. Henschke, Jr.

[57] ABSTRACT

Compounds of the following formula are insect chemosterilants:

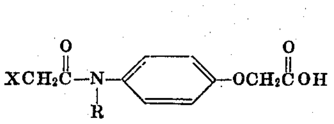

where R is alkyl of not more than four carbon atoms and X is halogen (Cl, Br, F and I).

7 Claims, No Drawings

CHEMOSTERILANT COMPOSITIONS FOR FLIES AND METHOD OF USE

This is a continuation-in-part of copending application, Ser. No. 677,082, filed Oct. 23, 1967 now abandoned.

This invention relates to chemosterilant compositions and to methods for the control or eradication of insect populations.

The term "insect" is used herein in its broad common usage to include spiders, mites, ticks and like pests which are not in the strict biological sense classified as insects. Thus, the usage herein conforms to the definitions provided by Congress in Public Law 104, the "Federal Insecticide, Fungicide, and Rodenticide Act" of 1947, Section 2, subsection *h*, wherein the term "insect" is used to refer not only to those small invertebrate animals belonging mostly to the class Insecta, comprising six-legged usually winged forms, as beetles, bugs, bees, flies, and so forth, but also to other allied classes of arthopods whose members are wingless and usually have more than six legs, as spiders, mites, ticks, centipedes, and wood lice.

In accordance with this invention it has been found that insects can be controlled or eradicated by a method which comprises exposing the insect to a sterilizing amount of a compound of the formula

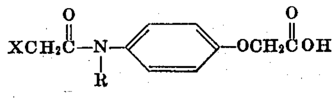

wherein R is alkyl of not more than four carbon atoms and X is halogen (Cl, Br, F and I).

The compounds of this invention can be prepared from p-alkylaminophenol sulfates by neutralizing the sulfate with a base such as sodium hydroxide to obtain the corresponding alkylaminophenol, which is then acetylated to form an acetyl-p-alkyl aminophenol. The acetylated product is then condensed with monochloroacetic acid, preferably in the presence of an alkali metal hydroxide to form the corresponding phenoxy acetic acid or sodium salt thereof, which is treated with hydrochloric acid to obtain the hydrochloride salt of a p-alkylaminophenoxy acetic acid. The condensation of the salt with a haloacetyl halide results in the compounds of the present invention. This synthesis of the compounds is illustrated by the following equations in which R and X have the aforesaid significance.

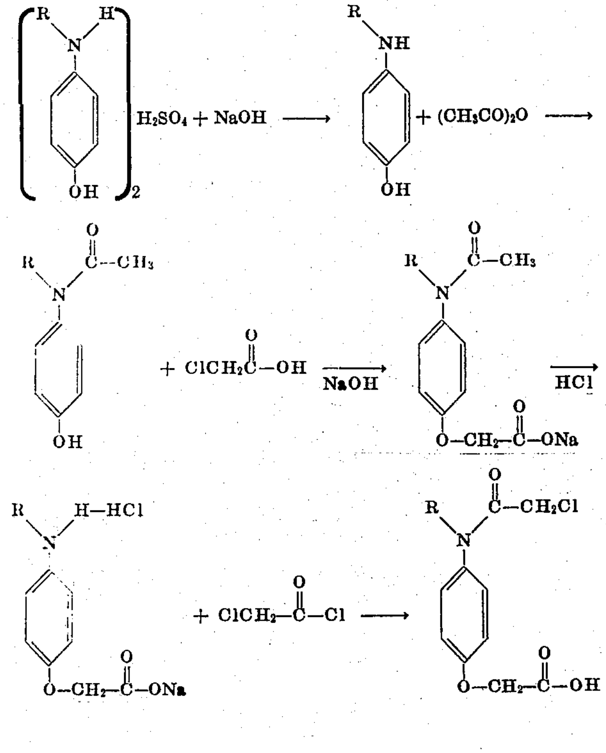

The preparation of these compounds is exemplified by the synthesis of 2-[p-(chloro-N-methyl acetamido)phenoxy] acetic acid.

EXAMPLE 1

About 50 grams of methylaminophenol sulfate and about 200 ml. of water were charged at room temperature into a suitable reaction vessel with agitation means. Approximately 34.5 grams of a 50 percent aqueous sodium hydroxide solution were gradually added while the reaction mixture was being stirred and a heavy paste was obtained. About 31 grams of acetic anhydride were added incrementally over a 15 minute period during which the temperature was not permitted to exceed 40° C. The reaction mixture was then cooled to 30° C. and filtered. The filter cake was suction washed with about 200 ml. of water and transferred from the filter to a suitable reaction vessel.

The resulting acetyl-p-methylaminophenol was mixed with about 100 ml. of water and about 23 grams of a 50 percent aqueous sodium hydroxide solution. About 33 grams of monochloroacetic acid were added to the clear solution, and a slurry was formed which remained after adding an additional 23 grams of 50 percent aqueous sodium hydroxide solution. The reaction mixture was then maintained at a temperature between 90°–100° C. for about 3 hours. At the end of the 3 hour period, the pH of the mixture was adjusted to between 9 and 10 with 50 percent aqueous sodium hydroxide solution. The mixture was then filtered to separate the sodium salt of acetyl-p-methylaminophenoxy acetic acid from the filtrate.

About 15 grams of the sodium salt thus obtained was added to approximately 50 ml. of 1:1 concentrated hydrochloric acid and water and heated at reflux for 2 hours. At the end of this time, the water and acid were removed by azeotropic distillation with benzene. The compound thus obtained was the hydrochloride salt of p-methylaminophenoxy acetic acid.

About 50 ml. of benzene, 24 grams of 20 percent aqueous sodium hydroxide solution and about 12.5 grams of the hydrochloride salt were charged into a suitable reaction vessel and cooled with agitation to about 2° C. A small amount of toluene was added to retard crystallization, and a mobile slurry was obtained with continued agitation. About 8.5 grams of chloroacetyl chloride were gradually added over a 15 minute period. During the addition of the chloroacetyl chloride sufficient 50 percent aqueous sodium chloride solution was added to maintain alkalinity. After all the reactants had been added, the reaction mixture was agitated for an additional 10 minutes at a temperature between 2° and 5° C. and then heated to 15° C. The reaction mixture was then acidified with concentrated hydrochloric acid to pH 1–2. The product thus obtained was 2-[p-(chloro-N-methyl acetamido)-phenoxy] acetic acid having a melting point of 92°–93° C.

For the sake of brevity, the compounds of the above formula which are useful in the compositions and methods of this invention are referred to hereinafter as "chemosterilants".

Representative chemosterilants which can be used in the compositions and methods of this invention include the following:

2-[p-(2-bromo-N-butyl-acetamido)phenoxy]acetic acid
2-[p-(2-fluoro-N-isopropyl-acetamido)phenoxy]acetic acid
2-[p-(2-iodo-N-ethyl-acetamido)phenoxy]acetic acid In carrying out the methods of this invention, the chemosterilants, admixtures thereof or compositions containing them are applied to the insects or to their environment in an amount sufficient to exert a sterilizing action. The chemosterilant compositions of this invention generally contain from about 0.001 percent to about 99.99 percent by weight of chemosterilant. The lower concentrations of chemosterilant are particularly effective when the compositions are liquid, but it is preferred to use higher concentrations of chemosterilant when the compositions are semi-solid or solid. Compositions comprising from about 0.001 percent to about 5 percent by weight of chemosterilant are preferred with those comprising from about 0.001 percent to about 2 percent by weight being particularly advantageous. A wide variety of insects, for example, house flies (*Musca domestica*), screw-worm flies (*Cochliomyia hominivorax*), Mexican fruit flies (*Anastrepha ludens*), oriental fruit fly, vinegar flies, eye gnats, stable flies, mosquitoes, boll weevils, pomace flies (*Drosophila melanogaster*), Mediterranean fruit flies, cotton bollworm, codling moth, plum curculio, and the like, can be controlled or eradicated in accordance with the methods of this invention.

The following example will illustrate the invention. Parts and percent are by weight unless otherwise indicated.

EXAMPLE II — MEXICAN FRUIT FLIES

Test flies are maintained in 8 × 8 × 8 inch cages at 25° C. (without humidity control) in a room ventilated by an exhaust fan. The chemosterilant is dissolved in acetone and added to 5 parts of carrier food composed of 4 parts granulated sugar and 1 part orange juice crystals, which are neutralized with sodium hydroxide. Each chemosterilant food composition is offered to 50 pairs of flies in one non-replicated lot. Feeding begins upon emergence and is continuous for the 20-day test duration. Flies are egged at 13 and 20 days of age and mortality is recorded at weekly intervals. The chemosterilants are evaluated on the basis of total mortality, egg production and hatch. With 2-[p-(chloro-N-methylacetamido)phenoxy]acetic acid at 1 percent concentration the mortality was zero, egg production was substantially reduced and egg hatch was 81 percent of control (100 percent).

In carrying out the methods of this invention, the chemosterilants can be used alone or in combination with an adjuvant in liquid, solid or gaseous form. The chemosterilant compositions of this invention are prepared by admixing the chemosterilant with an adjuvant including diluents, extenders, carriers and conditioning agents to provide compositions in the form of finely divided particulate solids, semi-solids, aerosols, solutions and dispersions or emulsions. Thus the chemosterilant can be used with an adjuvant such as a finely divided particulate solid, a liquid of organic origin, water, a wetting agent, dispersing agent, an emulsifying agent or any suitable combination of these.

Typical finely divided solid carriers and extenders which can be used in the chemosterilant compositions of this invention include for example, the talcs, clays, pumice, silica, diatomaceous earth, quartz, Fuller's earth, salt, sulfur, powdered cork, powdered wood, walnut flour, chalk, tobacco dust, volcanic ash, cottonseed hulls, wheat flour, soybean flour, tripoli, ground corn cobs, charcoals and the like. Typical liquid diluents include for example, kerosene, Stoddard solvent, hexane, benzene, toluene, water, acetone, ethylene dichloride, xylene, alcohols, Diesel oil, glycols and the like. Typical liquified gasses for aerosols include for example, haloalkyls such as dichlorodifluoromethane, fluorotrichloromethane, and the like. Typical semi-solid extenders include for example, soap, petroleum jelly, and the like.

The chemosterilants also can be employed in conjunction with attractants for the particular insect being controlled. For example, they can be applied to or admixed with attractants or baits such as sucrose, glucose, molasses, protein mixtures, powdered egg yolk, powdered milk, yellow corn grits, quincy granules, pumice granules, sex attractants, and the like.

The chemosterilant compositions of this invention, particularly liquids and wettable particles, usually contain as a conditioning agent one or more surface active agents in amounts sufficient to render a given composition readily dispersible in water or in oil. By the term "surface-active agent" it is understood that wetting agents, dispersing agents, suspending agents and emulsifying agents are included therein.

The term "chemosterilant composition" as used herein and in the appended claims includes not only compositions in a suitable form for application but also concentrated compositions which require dilution or extension with a suitable quantity of liquid or solid adjuvant prior to application.

Surface-active agents which can be used in the chemosterilant compositions of this invention are set out, for example, in Searle U.S. Pat. No. 2,426,417, Todd U.S. Pat. No. 2,655,447, Jones U.S. Pat. No. 2,412,510 and Lenher U.S. Pat. No. 2,139,276. A detailed list of such agents is also set forth by J. W. McCutcheon in "Soap and Chemical Specialties," Nov. 1947, page 8011 et seq., entitled "Synthetic Detergents"; "-Detergents and Emulsifiers — Up to Date" (1960), by J. W. McCutcheon, Inc., and Bulletin E-607 of the Bureau of Entomology and Plant Quarantine of the U.S.D.A. In general, less than about 50 parts by weight of the surface active agent is present per 100 parts by weight of chemosterilant composition.

The preferred chemosterilant compositions are the wettable powders, dusts, aqueous suspensions or solutions, hydrocarbon solutions and emulsifiable oils.

Wettable powders are water-dispersible compositions containing one or more chemosterilants, an inert solid extender and one or more wetting and dispersing agents. The inert solid extenders are usually of mineral origin such as the natural clays, diatomaceous earth and synthetic minerals derived from silica and silicate. Examples of such extenders include kaolinites, attapulgite clay and synthetic magnesium silicate.

Preferred wetting agents are alkyl benzene and alkyl naphthalene sulfonates, sulfated fatty alcohols, amines or acid amides, long chain acid esters of sodium isethionate, esters of sodium sulfosuccinate, sulfated or sulfonated fatty acid esters, petroleum sulfonates, sulfonated vegetable oils, ditertiary acetylinic glycols and polyoxyethylene derivatives of alkylphenols (particularly isooctylphenol and nonylphenol) and polyoxyethylene derivatives of the mono-higher fatty acid esters of hexitol anhydrides (e.g. sorbitan). Preferred dispersants are methyl cellulose, polyvinyl alcohol, sodium lignin sulfonates, polymeric alkyl naphthalene sulfonates, sodium naphthalene sulfonate, polymethylene bisnaphthalenesulfonate and sodium N-methyl-N-(long chain acid) taurates.

The wettable powders compositions of this invention usually contain from about 5 to about 95 parts of chemosterilant, from about 0.25 to about 25 parts of wetting agent, from about 0.25 to about 25 parts of dispersant and from about 4.5 to about 94.5 parts of inert solid extender, all parts being by weight of the total composition. Where required from about 0.1 to 2.0 parts by weight of the solid inert extender can be replaced by a corrosion inhibitor or anti-foaming agent or both.

Dusts are dense finely divided particulate compositions which are intended for application in dry form. Dusts are characterized by their free-flowing and rapid settling properties so that they are not readily wind-borne to areas where they are of no value. Dusts contain primarily a chemosterilant and a dense, free-flowing, finely divided particulate extender. However, their performance is sometimes aided by the inclusion of a wetting agent such as those listed hereinbefore under wettable powder compositions and convenience in manufacture frequently demands the inclusion of an inert, absorptive grinding aid. Suitable classes of grinding aids are natural clays, diatomaceous earth and synthetic minerals derived from silica or silicate. Preferred grinding aids include attapulgite clay, diatomaceous silica, synthetic fine silica and synthetic calcium and magnesium silicates.

The inert finely divided solid extender for the dusts can be of vegetable or mineral origin. The solid extenders are characterized by possessing relatively low surface areas and are poor in liquid absorption. Suitable inert solid extenders for phytotoxic dusts include micaceous talcs, pyrophyllite, dense kaolin clays, ground calcium phosphate rock and tobacoo dusts.

The wettable powders described above can also be used in the preparation of dusts. While such wettable powders can be used directly in dust form, it is more advantageous to dilute them by blending with the dense dusts diluent. In this manner, dispersing agents, corrosion inhibitors and anti-foam agents may also be found as components of a dust.

Emulsifiable oils are usually solutions of chemosterilant in water-immiscible or partially water-immiscible solvents together with a surfactant. Suitable solvents for the active ingredient of this invention include hydrocarbons and certain water-immiscible ethers, esters or ketones. Suitable surfactants are anionic, cationic and non-ionic such as alkyl aryl polyethoxy alcohols, polyethylene sorbitol or sorbitan fatty acid esters, polyethylene glycol fatty esters, fatty alkyllol amide condensates, amine salts of fatty alcohol sulfates together with long chain alcohols and oil soluble petroleum sulfonates or mixtures thereof. The emulsifiable oil compositions generally contain from about 5 to 95 parts active ingredient, about 1 to 50 parts surfactant and about 4 to 94 parts solvent, all parts being by weight based on the total weight of emulsifiable oil.

Although the invention is described with respect to specific modifications, the details thereof are not to be construed as limitations except to the extent indicated in the following claims.

What is claimed is:

1. A method for sterilizing flies which comprises contacting flies with a sterilizing amount of a compound of the formula

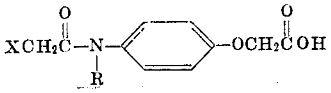

wherein R is alkyl of at least one and not more than four carbon atoms and X is halogen.

2. The method of claim 1 wherein X is chlorine.

3. The method of claim 1 wherein the compound is 2-[p-(2-chloro-N-methylacetamido)phenoxy]acetic acid.

4. The method of claim 1 wherein the flies are Mexican fruit flies.

5. Chemosterilant composition comprising an adjuvant, a surface-active agent, and as an essential active ingredient a sterilizing amount of a compound of the formula

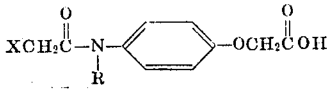

wherein R is alkyl of at least one and not more than four carbon atoms and X is halogen.

6. The composition of claim 5 wherein X is chlorine.

7. The composition of claim 5 wherein the compound is 2-[p-(chloro-N-methylacetamido)phenoxy]acetic acid.

* * * * *